(12) United States Patent
Clinch

(10) Patent No.: US 6,208,374 B1
(45) Date of Patent: Mar. 27, 2001

(54) VIDEO DISPLAY SYSTEMS

(75) Inventor: Noah Clinch, Wells (GB)

(73) Assignee: Second Opinion Solutions AS, Oslo (NO)

(*) Notice: Subject to any disclaimer, the term of this patent is extended or adjusted under 35 U.S.C. 154(b) by 0 days.

(21) Appl. No.: 09/147,497

(22) PCT Filed: Jul. 9, 1997

(86) PCT No.: PCT/NO97/00175

§ 371 Date: Mar. 30, 1999

§ 102(e) Date: Mar. 30, 1999

(87) PCT Pub. No.: WO98/01999

PCT Pub. Date: Jan. 15, 1998

(30) Foreign Application Priority Data

Jul. 10, 1996 (GB) .................................................. 9614434

(51) Int. Cl.[7] .................................................. H04N 7/18
(52) U.S. Cl. .................................................. 348/79
(58) Field of Search .................. 348/79, 80, 61, 348/64; 382/128; 378/98.2, 98.8; 345/121, 123

(56) References Cited

U.S. PATENT DOCUMENTS

| | | | |
|---|---|---|---|
| 4,719,644 | 1/1988 | Herzog et al. | 378/98.2 |
| 4,817,184 * | 3/1989 | Thomason et al. | 382/141 |
| 5,216,596 | 6/1993 | Weinstein | 348/79 |
| 5,297,034 | 3/1994 | Weinstein | 382/128 |
| 5,345,552 * | 9/1994 | Brown | 395/341 |
| 5,831,614 * | 11/1998 | Tognazzini et al. | 345/341 |
| 5,937,096 * | 8/1999 | Kawai | 382/236 |
| 6,006,191 * | 12/1999 | DiRienzo | 705/2 |

FOREIGN PATENT DOCUMENTS

| | | | |
|---|---|---|---|
| 0 507 439 | 10/1992 | (EP) . | |
| 0 585 853 | 3/1994 | (EP) . | |
| 407327935 * | 12/1995 | (JP) | A61B/5/00 |

* cited by examiner

*Primary Examiner*—Vu Le
(74) *Attorney, Agent, or Firm*—Oblon, Spivak, McClelland, Maier & Neustadt, P.C.

(57) ABSTRACT

A method for transmission of a sequence of high quality images for display on a visual display unit is described. It has particular application in the field of telepathology, where magnified images obtained by scanning a medical specimen on the stage of an optical microscope are transmitted from a local pathologist to a remote consultant for diagnosis. The method consists of the steps of advancing the field of view of the camera in discrete steps across the object being viewed to capture a sequence of contiguous images, temporarily storing a digital representation of a first of the images in a first buffer store and a digital representation of at least part of the next succeeding image in a second buffer store, controlling the data in the two buffers stores such that the data follows the leading edge of the advancing viewpoint and data in the first buffer store representing a trailing incremental strip of the first stored image is progressively discarded while data in the second buffer store representing a trailing incremental strip of the next contiguous image is transferred to a location in the first buffer store occupied by the data representing a leading incremental strip of the first stored image.

13 Claims, 1 Drawing Sheet

VIDEO DISPLAY SYSTEMS

BACKGROUND OF THE INVENTION

1. Field of the Invention

This invention relates to the transmission of a sequence of high quality images for display on a visual display unit. It has particular application in the field of telepathology where magnified images obtained by scanning a medical specimen on the stage of an optical microscope are transmitted from a local pathologist to a remote consultant for diagnosis.

2. Discussion of the Background

For general diagnostic practice in tumour histopathology and cytopathology, because of the potentially serious consequences of misdiagnosis, it is hardly ever acceptable to examine just one or a few static images from the microscope, no matter how high their individual quality may be. Instead, it is accepted that the diagnositician must be free to examine any part of the specimen, at any of the magnification factors which the microscope allows. Thus the remote consultant should have the ability to 'scan' the field of view across the specimen on the microscope stage; both along the left-right (-x) axis and the top-bottom (-y) axis of the field of view. The consultant should also be able to move the stage in the longitudinal (-z) axis of the microscope to adjust the focus.

Controlling the microscope stage through verbal instructions to a local pathologist is unacceptably slow and unreliable. Transmitting a complete set of images which together cover the whole specimen could be done automatically using a motorised stage and suitable camera control software, but would require the transmission of around 4000 images for a histopathology section of 15 mm by 10 mm. This again is unacceptable.

Accordingly, remote control of the sender's microscope is virtually essential for a practical system.

One such system is described, for example, in U.S. Pat. Nos. 5,216,596 and 5,297,034. In this known system, the magnified image of the specimen is recorded by a video camera and converted to an electronic video signal which is then transmitted over a communication link to a remote video display monitor. Control signals are generated by a computer processing unit at the remote workstation for remotely controlling the functions of the microscope, including motorised stage movement, magnification, focus and illumination control.

The main problem with this known system is that the quality of the image viewed by the remote consultant on the display monitor is well below the quality that would be seen by viewing the specimen directly through the microscope.

There is an emerging consensus that 1024>768 is the minimum acceptable pixel format for display of diagnostic-quality images on a high-resolution colour monitor. This rules out the use of all analog video cameras, monitors and image compression/decompression devices (codecs) which are based on broadcast standards such as PAL or NTSC. The bandwidth limitation imposed by the broadcase standards reduces the effective pixel number in each image to about a quarter of the number required for diagnostic resolution; in addition, in composite TV equipment, the colour resolution of the signal is further reduced by the chrominance subsampling.

Although digital videocameras with CCD chips are now available which are suitable for capturing high-resolution microscope images, these cannot be used to directly display images on composite video monitors. Instead they are designed to work with image digitisers (frame grabbers) by means of which a digital representation of the image is stored in RAM, or in storage medium such as magnetic disc or CD ROM. To visually display such an image, it must be written to an 'RGB' colour monitor with a display driver capable of handling images of at least 1024×768 pixels at 8 or more bits/colour channel.

The overriding problem in the use of digital cameras in a telepathology diagnostic system is that, unlike analog video cameras, digital cameras cannot provide images at video rate: in fact a maximum rgb frame rate of about $\frac{1}{25}$ of video rate (2/sec), is typical, and in several cases the frame rate is less than 1/sec.

Although standard analog TV videocodec technology can be used to compress the video images such that the required bandwidth is reduced to a practical level (say 384 kbit/sec), if 50 images must be transmitted per second, this allows 384/50 or about 8 kbits per image. Since the final image is normally reduced to a size of (512×384) 24 bit pixels (or about 4 Mbit), this requires the codec to perform (lossy) image compression of 500:1. This can only be achieved at the expense of significant image degradation.

To achieve smooth scrolling of the field of view of a digital videocamera across a specimen, the image refresh rate in the viewport must be comparable to the flicker fusion frequency of normal human vision, say 30/sec. But because the maximum image capture rate of the digital camera is much less than this (of the order of 1 frame/sec), it is not possible to simply grab, transmit, and display a stream of complete high-resolution images as the specimen is scanned under the objective. To overcome this fundamental difficulty without loss of image resolution, the present invention makes use of the fact that during scrolling, between one screen refresh and the next, although the rgb values of every pixel will in general be changed, the bulk of the display if simply shifted slightly in a vertical or horizontal direction so that the information content of the image as a whole remains almost constant.

SUMMARY OF THE INVENTION

According to the present invention there is provided a method of displaying a sequence of images from a digital videocamera on a video display unit, the method comprising advancing the field of view of the camera in discrete steps across the object being viewed to capture a sequence of contiguous images, temporarily storing a digital representation of a first of the images in a first buffer store and a digital representation of at least part of the next succeeding image in a second buffer store, controlling the data in the two buffer stores such that the data follows the leading edge of the advancing viewport and data in the first store representing a trailing incremental strip of the first stored image is progressively discarded while data in the second store representing a trailing incremental strip of the next contiguous image is transferred to a location if the first store occupied by the data representing a leading incremental strip of the first stored image, and reading out the contents of the first buffer store to the display unit.

The second buffer may either hold data representing a complete new image in the camera viewport, or data representing an increment of 'scroll quanta' of the image. Where the second buffer holds an entire image, an intermediate or 'scroll' buffer containing the 'scroll quanta' may be inserted between the first and second buffers. Where the second store contains an entire image, the incrementing is continued until the entire contents of the first buffer store representing the original image stored therein have been discarded, and a new image is then grabbed into the second buffer store and the process is repeated. Alternatively, the new image is stored in a third buffer store and the contents of the second buffer store are then replenished continuously with increments from the third buffer store. In either case, the specimen appears to be scrolling smoothly across the field of view while in reality it is moved in a series of quick steps followed by capture of contiguous images.

The data entered into the first buffer representing the trailing incremental strip of the image stored in the second buffer store can be entered directly from the second buffer store or through an intermediate scroll buffer containing only the incremental portion of the image being transferred.

When scrolling in the y-direction, the progressive replenishment of the image in the first store is performed line by line or in multiples of one complete line, whereas during x-scrolling each line of the displayed image is created as a composite of the corresponding lines in the image buffers.

For a colour rgb image, first and second buffers can be provided for each of the three colour components, and the readout is to a single common display buffer.

BRIEF DESCRIPTION OF THE DRAWINGS

By way of example only, an embodiment of the invention will now be described with reference to the accompanying drawings in which.

DETAILED DESCRIPTION OF THE PREFERRED EMBODIMENTS

Figure 1:
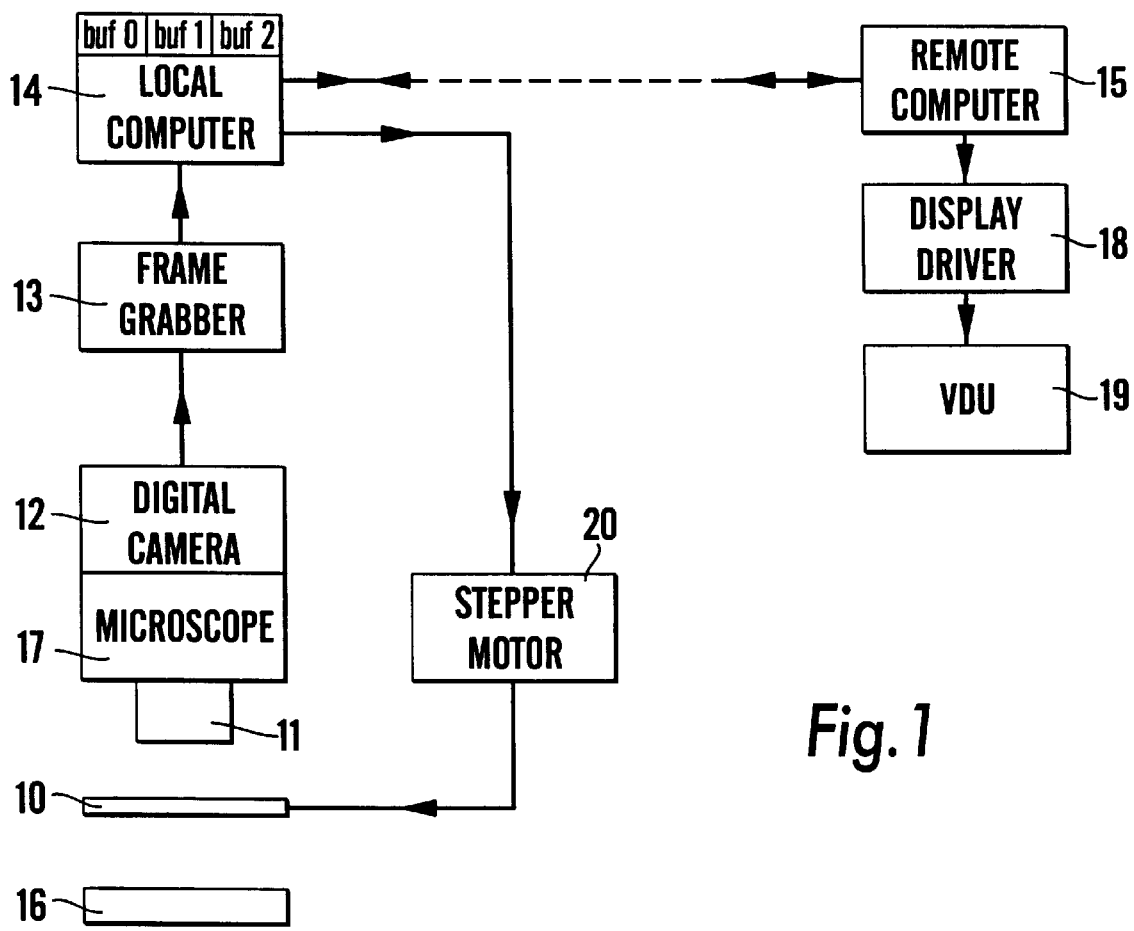
FIG. 1 is a schematic block diagram of a remote control telepathology system.

Referring to these figures, the pathological specimen to be viewed is placed on a microscope stage 10 beneath an objective lens 11 of the microscope 17 and illuminated by a light source 16. A digital video camer 12 with a CCD chip suitable for capturing high-resolution microscope images is fitted to the microscope.

A digital interface card (frame grabber) 13 retrieves and stores a digital representation of the image viewed by the camera 12, and this digital representation is processed by a local computer 14 and transmitted to a remote computer 15 operated by a consultant.

The remote computer 15 is linked through a display driver 18 to a video display unit 19.

The microscope stage 10 is remotely controlled by the consultant through a stepper motor unit 20. A similar situation holds in the case where the consultant wishes to use the computer 15 to control a local microscope (not shown). As the consultant drives the microscope stage in discrete steps under the (fixed) objective 11 of the microscope 17, it appears as though a viewport of fixed size is being moved (scrolled) smoothly across a single very large image of the specimen (referred to herein as a 'virtual digital image').

Figure 2:
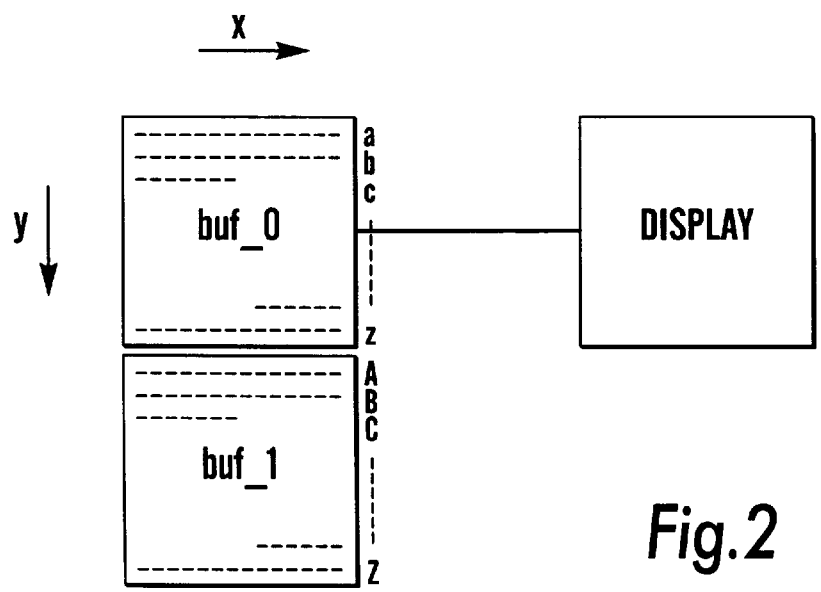
FIG. 2 is a diagram illustrating the y-scrolling of the image in the system of FIG. 1.

The manner in which apparent scrolling of the viewport across the virtual digital image is achieved is illustrated in FIG. 2. Scrolling can take place in both directions along trajectories parallel to either the 'y'-axis or to the 'x'-axis. For simplicity we will first describe the method used for downward scrolling across a 'virtual digital image' made of uncompressed monochrome or interleaved-colour images. This method can be easily extended to scrolling in any direction across any type of digital image, including compressed and non-interleaved colour images, and including images with any number of bits per pixel.

In the following description, the number of bits/pixel in each uncompressed image is called 'nbits'. The number of horizontal 'lines' in each image will be denoted by 'ymax', and the number of pixels within each of these horizontal 'lines' by 'xmax'. Thus xmax, ymax are the digital width and height of the images respectively and the buffer size required to hold a single image is given by the product (xmax, ymax, nbits).

FIG. 2 schematically represents two contiguous digital images, continuous in the specimen's 'y'-direction which have been acquired into buffer stores buf_0 and buf_1. The data buffers are continuous blocks of RAM, allocated at start-up by the operating system of the computer at the request of the controlling program. The individual (x) scanlines in the images are denoted a, b, c . . . and A, B, C . . . in buf_0 and buf_1 respectively. Scanning commences at a point in time when the image in buf_0 is already being displayed.

Scrolling on the Local Workstation

Each elemental downward 'scroll event' can be achieved through the following series of steps:

(1) left-shift the contents of buf_0 by N(nbits.xmax) bits, where N represents the number of lines in each scroll event. (Note that N should be chosen such that ymax is an integer multiple of N.)

(2) copy the first N(nbits.xmax) from buf_1 into a temporary 'scroll quantum' buffer (not shown).

(3) write the contents of the scroll quantum buffer into buf_0, starting at an offset in buf_0 given by (xmax (ymax-N)nbits.

(3a) write the contents of the scroll quantum buffer to the output comms port.

(4) left-shift the contents of buf_1 by N(nbits.xmax)

(5) display the contents of buf_0

If it is not necessary to transmit the scrolling viewport to another workstation over a LAN or WAN connection, then step 3a will be omitted. In this case the scroll quantum buffer can also be dispenses with since the scroll quantum can be copied directly from buf $_{13}$ 1 to buf_0.

Steps 1–5 can be repeated to continue scrolling until (ymax/N) scroll events have been competed. At this point there is no more useful data in buf_1 and the scroll process must pause while a new image is acquired into buf_1. Scrolling can then resume as before until a further (ymax/N) scroll events have occurred, etc. If it is desired to reduce the slight irregularity which accompanies this type of scrolling. It is a simple matter to use three buffers instead of two, at the cost of more memory allocation and slightly greater complexity in programming.

In practice, by writing directly to the display hardware, this process can be accomplished within 15 msec, easily meeting the need to refresh the display at 30 frames/sec to create the impression of smooth scrolling. To scroll across a full viewport dimension in this way takes approximately 12 sec. using compiled Visual C++ code, a standard rgb display board and an Intel P166 cpu. If two complete new lines (a, b, c d, . . . ) are copied to buf_0 in each 'scroll event', then the time taken to scan one complete frame height is halved without noticeable loss of smoothness in scrolling. Further incrementing the 'line quantum' gives a slight but noticeable jerkiness to the scrolling, which may be acceptable as the price to pay for faster scrolling. For a colour image, six image buffers would be required to accommodate the colour image planes received from the camera, the display buffer buf_2 holding the composite image to be displayed on the monitor at any instant.

Scrolling on the Remote Workstation

Examination of the five steps which make up a single local scroll event shows that a similar sequence can be carried out on a remote host, but here instead of holding an entire image, buf_1 is replaced by the input buffer provided by the communications software layer which holds the 'scroll quanta' of size N(xmax.nbits) bits. Starting from the same point as before, with both computers displaying the same initial image from their respective buf_0 memories, the sequence on the remote host for a parallel downward scroll event then becomes (1) left-shift contents of the remote buf_0 by N(nbits.xmax) bits, where N represents the number of lines in each scroll event.

(2) read a 'scroll quantum' of N(nbits.xmax) bits from the comms input data stream into a remote buf_0, starting at an offset in the remote buf_$_o$ given by (xmax(ymax-N)nbits.

(3) display the contents of buf_0.

In this way the communications link is used to transmit a stream of successive 'scroll quanta'. While not essential to the concept of viewport scrolling presented here, this method has two advantages compared with the alternative strategy of transmitting a succession of entire images to the remote host:

a) following initiation of the scrolling process via the local host's gui, scrolling begins earlier on the remote host. This is because there is no need to wait for an entire image to be transmitted before beginning scrolling on the remote host.

b) because the image is transmitted in small 'chunks' rather than as one long bitstream, buffer management and error handling are made easier on the remote host.

Movement of the specimen under the objective lens 11 in all three orthogonal axes is brought about through activation of one or more of three stepper-motors provided with the motorised stage. The three stepper-motors are driven directly from the proprietary stage controller hardware which in turn receives appropriate control signals in the form of ASCII strings via an RS232 port of the local computer 14.

The microscope stage 10 is controlled by the consultant using a mouse to activate one of the four arrow symbols which the gui provides ('scroll forward, scroll back, scroll left, scroll right'). The key feature of this type of control is that the microscope does not move smoothly at constant speed: on the contrary, the stage is made to move in steps corresponding to the absolute height ($y_0$) or width ($x_0$) of the region in the viewport frame as appropriate to the selected direction of travel. For example, suppose that the camera/framegrabber in use provides an image (viewport) of height 768 pixels, and that calibration of the system with stage micrometer while using a specific objective lens shows that 1 mm in the focal plane corresponds to 218 pixels. It follows that $y_0$=3.52 mm, and this will be programmed into the startup script during the initial calibration. If now the mouse is used to select the 'scroll forward' arrow, the stage will be made to move forward in steps of 3.52 mm. Immediately that each step is completed (approx 1 sec), an image is grabbed and compressed to RAM (0.5 sec). Once an initial static image has been transferred to the remote display buffer, all that is required is that this buffer is treated in the same way as buf_0 in FIG. 2, ie it must be updated by incorporation of the 'scroll quanta' which it gets from the local computer.

When one of the 'arrow keys' is activated, then the stage immediately moves by one viewport height (or width) in the appropriate direction and an image is grabbed to buf_1. No further movement of the stage occurs until the viewport is scrolled completely out o fbuf_0, whereupon the stage is made to jump ahead again.

When scrolling in the x-direction, it is no longer possible to simply shift the entire contents of the store to the right or left when incrementing the stored data. Instead, the data representing an incremental strip in the x-direction must be retrieved from each of the ymax lines in the appropriate store and either discarded or combined with the data of the corresponding ymax lines in the other store to form an up-dated image.

Other applications of the described system will exist wherever readout of data from a videocamera is slow compared to the movement of a fixed scene across the field of view. In the present example, the image of the specimen is moved across the CCD camera chip in a 'salatory' or 'jumping' motion so that a smooth, continuous motion can be accurately displayed on the VDU. The same principle might be used to move the camera itself in this way across a static object to produce a similar effect. For example, if the camera were made to perform a series of rotations through a fixed angular distance about a static axis, pausing on the way to take a series of static images of a panoramic scene, then these images could be processes in the way described above to reconstruct the visual effect of a smooth panning motion across the scene at almost any desired speed. A similar process could be used to make smooth images in aerial photography, virtual reality constructions etc., provided that the object in view is not changing appreciably during the period in which the images are acquired.

What is claimed is:

1. Method of displaying a sequence of images from a digital videocamera on a video display unit, the method being characterized by the steps of advancing the field of view of the camera is discrete steps across the object being viewed to capture a sequence of contiguous images, temporarily storing a digital representation of a first of the images in a first buffer store and a digital representation of at least part of the next succeeding image in a second buffer store, controlling the data in the two buffer stores such that the data follows the leading edge of the advancing viewport and data in the first store representing a trailing increment strip of the first stored image is progressively discarded while data in the second store representing a trailing increment strip of the next contiguous image is transferred to a location in the first store occupied by the data representing a leading incremental strip of the first stored image, and reading out the contents of the first buffer store to the display unit.

2. Method according to claim 1, characterized in that where the second buffer holds an entire image, an intermediate 'scroll' buffer containing the 'scroll quanta' is inserted between the first and the second buffers.

3. Method according to claim 2, in which the image is a color RGB image, characterized in that the first and second buffers are provided for each of the three color components, and that the readout is to a single common display buffer.

4. Use of a method according to claim 2 in a system for transferring pathological information, such as scanned images, from a local to a remote location.

5. Method according to claim 1,
characterized in that the second buffer contains an entire image, that the incrementation is continued until the entire contents of the first buffer store representing the original image stored therein have been discarded, and that a new image is then grabbed into the second buffer store and the process is repeated.

6. Method according to claim 5, in which the image is a color RGB image,
characterized in that the first and second buffers are provided for each of the three color components, and that the readout is to a single common display buffer.

7. Use of a method according to claim 5 in a system for transferring pathological information, such as scanned images, from a local to a remote location.

8. Method according to claim 1,
characterized in that the new image is stored in a third image store and that the contents of the second buffer store are then replenished continuously with increments from the third buffer store.

9. Method according to claim 8 in which the image is a color RGB image,
characterized in that the first and second buffers are provided for each of the three color components, and that the readout is to a single common display buffer.

10. Use of a method according to claim 8 in a system for transferring pathological information, such as scanned images, from a local to a remote location.

11. Method according to claim 1, in which the image is a colour RGB image,
characterized in that the first and second buffers are provided for each of the three colour components, and that the readout is to a single common display buffer.

12. Use of a method according to claim 11 in a system for transferring pathological information, such as scanned images, from a local to a remote location.

13. Use of a method according to claim 1 in a system for transferring pathological information, such as scanned images, from a local to a remote location.

* * * * *